United States Patent
Svendsen (10) Patent No.: US 8,630,426 B2
(45) Date of Patent: Jan. 14, 2014

(54) HOWLING SUPPRESSION USING ECHO CANCELLATION

(75) Inventor: Peter William Hilding Svendsen, Virum (DK)

(73) Assignee: Motorola Solutions, Inc., Schaumburg, IL (US)

( * ) Notice: Subject to any disclaimer, the term of this patent is extended or adjusted under 35 U.S.C. 154(b) by 867 days.

(21) Appl. No.: 12/613,638

(22) Filed: Nov. 6, 2009

(65) Prior Publication Data

US 2011/0110532 A1    May 12, 2011

(51) Int. Cl.
*H04R 3/02* (2006.01)
*H04S 3/02* (2006.01)
*G10L 19/008* (2013.01)

(52) U.S. Cl.
USPC ............ 381/93; 381/95; 381/96; 381/83; 381/22; 381/23

(58) Field of Classification Search
USPC ............... 381/22–23, 83, 93, 95–96
See application file for complete search history.

(56) References Cited

U.S. PATENT DOCUMENTS

| | | | |
|---|---|---|---|
| 5,696,821 A | 12/1997 | Urbanski | |
| 6,741,874 B1 | 5/2004 | Novorita | |
| 2005/0132264 A1* | 6/2005 | Joshi et al. | 715/500.1 |
| 2006/0177045 A1 | 8/2006 | Thomas et al. | |
| 2010/0183163 A1 | 7/2010 | Matsui et al. | |
| 2010/0257279 A1* | 10/2010 | Chiang | 709/231 |

FOREIGN PATENT DOCUMENTS

EP    2164183 A1    3/2010

OTHER PUBLICATIONS

PCT International Search Report Dated Dec. 17, 2010.

* cited by examiner

*Primary Examiner* — Duc Nguyen
*Assistant Examiner* — George Monikang
(74) *Attorney, Agent, or Firm* — Anthony P. Curtis; Daniel R. Bestor (57) ABSTRACT

A method for reducing howling in a communication system containing collocated mobile devices is presented. In a transmitter, an audio signal is received at a microphone. Acoustic feedback is removed from the audio signal and the resulting signal is encoded and transmitted either using direct or trunked mode operation to a receiver. The encoded signal is decoded at the transmitter, in addition to at the receiver, and fed back to an echo canceller with sufficient delay to account for substantially the entirety of a loop delay from encoding of the audio signal to reception of the acoustic feedback at the microphone to enable removal of the acoustic feedback. An estimate of the acoustic feedback is used to initially remove the acoustic feedback, the error being fed back to the processor to adaptively change the signal being subtracted from the audio signal to better reduce the acoustic feedback.

8 Claims, 9 Drawing Sheets

HOWLING SUPPRESSION USING ECHO CANCELLATION

TECHNICAL FIELD

The present application relates to wireless communication systems. More specifically, the application relates to suppressing acoustic feedback between mobile communication devices in wireless communication systems.

BACKGROUND

Group-directed communications are commonplace in enterprise and public safety communication systems. One mobile communication device (transmitter) transmits an audio signal to a given group (talkgroup) of receiving mobile communication devices (receivers). These receivers reproduce the audio signal through an amplified speaker. The reproduced audio signal is typically audible to people other than merely the user of the particular mobile device emitting the sound, notably in circumstances in which the amplification of each mobile device may be maximized due to the large amount of ambient noise.

In a number of situations, at least some of the mobile devices in the talkgroup are located near each other. This is particularly true in public safety incidences, in which personnel often respond to such incidences in a group, and this group (or a subset thereof) is located in the same local area for an extended period of time. If a transmitter and receiver are collocated, e.g., within a few meters of each other, the microphone on the transmitter may become acoustically coupled to the speaker on the receiver. In this case, the loop gain conditions may be such that acoustic coupling sets up a feedback loop that creates an undesirable acoustic signal often referred to as "howling," owing to the piercing, shrill sound produced by the receiving radio speaker. Howling causes saturation in the communication channel and power amplifiers and speakers in the receivers which disrupts communication.

As above, such situations are especially prevalent in public safety incidents in which the transmitter and receiver(s) are often disposed within sufficient range and for a long enough time period to cause howling. While howling is irritating in normal situations, it is potentially disastrous during public safety incidents; notably if critical information is lost, misconstrued due to the feedback, or must be re-transmitted causing an unacceptable delay. It is therefore desirable to reduce, if not eliminate, instances of howling.

Some communication systems minimize howling by using signal processing techniques to detect and minimize the effect. Filters can be inserted into the signal path to decrease loop gain at frequencies where howling is likely to occur. Unfortunately, the desired signal is often undesirably distorted by the filters. In any event, these systems also only detect the phenomenon after it has started, which in emergency situations may be too late to have lost vital audio information or require repetition of such information, losing time that may be critical.

Accordingly, there remains a need for a method that reduces howling in an efficient and cost-effective manner.

SUMMARY

Various embodiments to reduce or eliminate howling in a communication system containing collocated mobile devices are disclosed. In one embodiment, the transmitter processes an audio signal received at a microphone. This processing removes acoustic feedback from the audio signal to produce a modified signal. The modified audio signal is then encoded, transmitted and decoded at the transmitter. The decoded audio signal is fed back while the audio signal is processed to enable the acoustic feedback to be removed from the audio signal. The decoded audio signal is sufficiently delayed prior to processing the audio signal to enable processing of the audio signal at an appropriate time that accounts for substantially the entirety of a loop delay from encoding of the audio signal to reception of the acoustic feedback at the microphone. The feedback contains a delayed version of the audio signal resulting from decoding of the transmitted encoded audio signal at a receiver of the collocated mobile devices to produce a decoded audio signal, emission of the decoded audio from a speaker of the receiver producing an emitted audio signal and reception of the emitted audio signal at the microphone of the transmitter.

In another embodiment, a transmitter comprises an echo canceller that removes acoustic feedback from an audio signal received by a microphone to produce a modified signal, an encoder that encodes the modified audio signal, transmitter circuitry and a decoder that respectively transmit and decode the encoded audio signal. The decoded audio signal is fed back to the echo canceller, which uses the decoded audio signal to remove the acoustic feedback from the audio signal. The decoded audio signal is sufficiently delayed prior to being supplied to the echo canceller to enable removal of the acoustic feedback, a delayed version of the audio signal received at the microphone, at an appropriate time that accounts for substantially the entirety of a loop delay from encoding of the audio signal to reception of the acoustic feedback at the microphone.

The transmitter can either operate in a direct mode operation in which loop delay is well approximated from known processes internal to the transmitter and receiver or in a trunked mode operation in which the transmitter receives the transmitted encoded audio signal from the infrastructure and the received signal is decoded to produce the decoded audio signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

The present application describes reduced howling between a transmitter and collocated receiver by use of echo cancellation. The receiving circuitry in the transmitter is active and uses audio signals encoded by the transmitter to cancel audio feedback. The encoded audio signals used in this manner are supplied via a feedback loop containing a delay and may be wholly internal or may be received externally from the network to the feedback loop.

As used herein, mobile devices are communication devices such as personally portable or vehicle-mounted mobile handsets that are able to communicate with each other, e.g. by having selected the same channel. A group of mobile devices in communication is referred to as a talkgroup. A particular channel on which the mobile device is communicating is typically selected at the mobile device through one or more user-actuated selectors. A mobile device may be a transmitter that transmits an audio signal on a particular channel to receivers who have selected the channel or a receiver that receives an audio signal transmitted by the transmitter. Each mobile device contains one or more microphones for the user to speak into to create the audio signal and, optionally, for noise cancellation. Each receiver receives the audio signal either directly from the transmitter or through a communication infrastructure and reproduces the transmitted audio using one or more speakers. The infrastructure contains one or more intermediaries such as access points or base stations that service the mobile devices.

A collocated transmitter-receiver pair is a pair of mobile devices that are disposed in a relatively small area such that audio reproduction from the receiver is close enough to generate feedback via the transmitter (either due to the audio signal or due to a common noise source) sufficient to cause howling. The separation between the transmitter and receiver that leads to howling being generated depends on a number of different factors in the transmitter and receiver. These factors include the volume setting of the speaker of the receiver, the acoustic responses of microphone and the speaker, the position of microphone relative to the speaker, and the gains of the paths along the transmitter and along the receiver, among others. This separation can be as small as about 0.5-1 meters for standard push-to-talk (PTT) mobile devices or as large as about 20 meters for PTT mobile devices that have high audio output and/or high microphone gain. As the separation between the devices decreases, howling becomes increasingly problematic as progressively lower volume levels will start to cause howling.

When a particular mobile device is to transmit to the other mobile devices in a talkgroup, an activation mechanism such as a PTT (push to talk) button is activated to initiate a signal. The signal initiated as a result indicates that the particular mobile device wishes to have the floor (i.e., the right to transmit). When the floor is available and the particular mobile device is granted the floor (e.g., by a central controller), it transmits to all of the mobile devices that have the appropriate channel selected and that have been granted access to the group communications.

Figure 1:
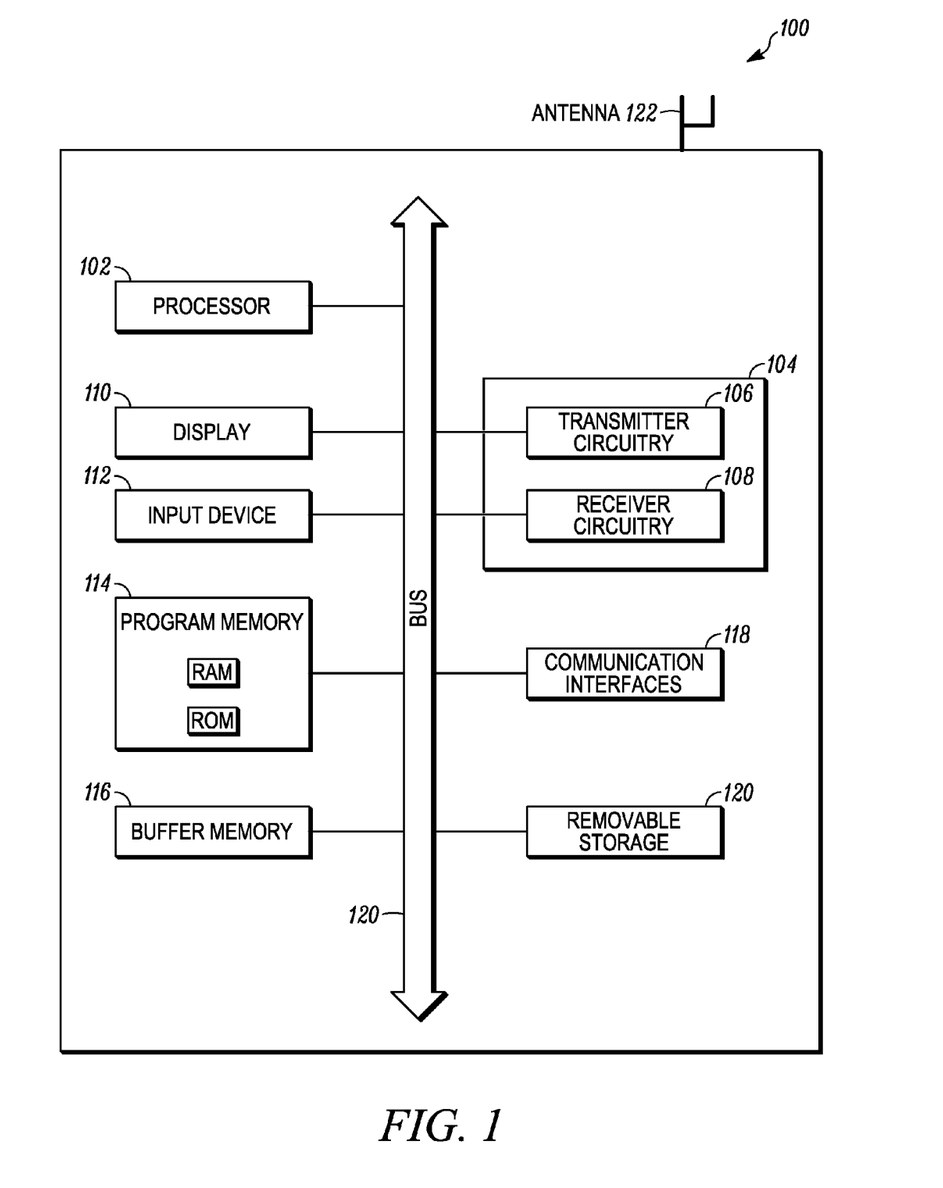
FIG. 1 illustrates a mobile device according to one embodiment.

FIG. 1 illustrates a block diagram of an exemplary mobile device 100. The device 100 contains, among other components, a processor 102, a transceiver 104 including transmitter circuitry 106 and receiver circuitry 108, an antenna 122, a display 110, an input device(s) 112, a program memory 114 for storing operating instructions that are executed by the processor 102, a buffer memory 116, one or more communication interfaces 118, and a removable storage 120. Although not shown, the device 100 also preferably includes an antenna switch, duplexer, circulator, or other highly isolative means (not shown) for intermittently providing information packets from the transmitter circuitry 106 to the antenna 122 and from the antenna 122 to the receiver circuitry 108. The device 100 is preferably an integrated unit containing at least all the elements depicted in FIG. 1, as well as any other elements necessary for the device 100 to perform its particular electronic function. Alternatively, the device 100 may comprise a collection of appropriately interconnected units or devices, wherein such units or devices perform functions that are equivalent to the functions performed by the elements of the device 100. For example, the device 100 may comprise a laptop computer and a Wireless Local Area Network (WLAN) card.

The processor 102 preferably includes one or more microprocessors, microcontrollers, DSPs, state machines, logic circuitry, or any other device or devices that process information based on operational or programming instructions. Such operational or programming instructions are preferably stored in the program memory 114. The program memory 114 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 102 has one or more of its functions performed by a state machine or logic circuitry, the memory 114 containing the corresponding operational instructions may be embedded within the state machine or logic circuitry. The operations performed by the processor 102 and the rest of the device 100 are described in detail below.

The transmitter circuitry 106 and the receiver circuitry 108 enable the device 100 to communicate information packets to and acquire information packets from the other nodes. In this regard, the transmitter circuitry 106 and the receiver circuitry 108 include appropriate, conventional circuitry to enable digital or analog transmissions over a wireless communication channel. The transmitter circuitry 106 and the receiver circuitry 108 are designed to operate over an ad hoc networking air interface (e.g., BLUETOOTH, 802.11 WLAN, Wi-Fi, WiMAX, . . . , etc.).

The implementations of the transmitter circuitry 106 and the receiver circuitry 108 depend on the implementation of the device 100. For example, the transmitter circuitry 106 and the receiver circuitry 108 may be implemented as an appropriate wireless modem, or as conventional transmitting and receiving components of two-way wireless communication devices. In the event that the transmitter circuitry 106 and the receiver circuitry 108 are implemented as a wireless modem, the modem can be internal to the device 100 or insertable into the device 100 (e.g., embodied in a wireless RF modem implemented on a Personal Computer Memory Card International Association (PCMCIA) card). For a wireless communication device, the transmitter circuitry 106 and the receiver circuitry 108 are preferably implemented as part of the wireless device hardware and software architecture in accordance with known techniques. One of ordinary skill in the art will recognize that most, if not all, of the functions of the transmitter circuitry 106 and/or the receiver circuitry 108 may be implemented in a processor, such as the processor 102. However, the processor 102, the transmitter circuitry 106, and the receiver circuitry 108 have been artificially partitioned herein to facilitate a better understanding.

The receiver circuitry 108 is capable of receiving RF signals from at least one band and optionally more bands, if the communications with the proximate device are in a frequency band other than that of the network communications. The receiver circuitry 108 may optionally comprise a first receiver and a second receiver, or one receiver capable of receiving in two or more bandwidths. The receiver circuitry 108, depending on the mode of operation, may be attuned to receive, for example, Bluetooth or WLAN, such as 802.11, communication signals. The transceiver 104 includes at least one set of transmitter circuitry 106. The transmitter circuitry 106 may be capable of transmitting to multiple devices potentially in multiple frequency bands.

The antenna 122 comprises any known or developed structure for radiating and receiving electromagnetic energy in the frequency range containing the wireless carrier frequencies. The buffer memory 116 may be any form of volatile memory, such as RAM, and is used for temporarily storing received information packets. The display 110 may be an LCD, OLED, or any other known display. The input devices 112 include one or more speakers and microphones and may further include an alpha-numeric keyboard, isolated buttons, soft and/or hard keys, touch screen, jog wheel, and/or any other known input device.

Figure 2:
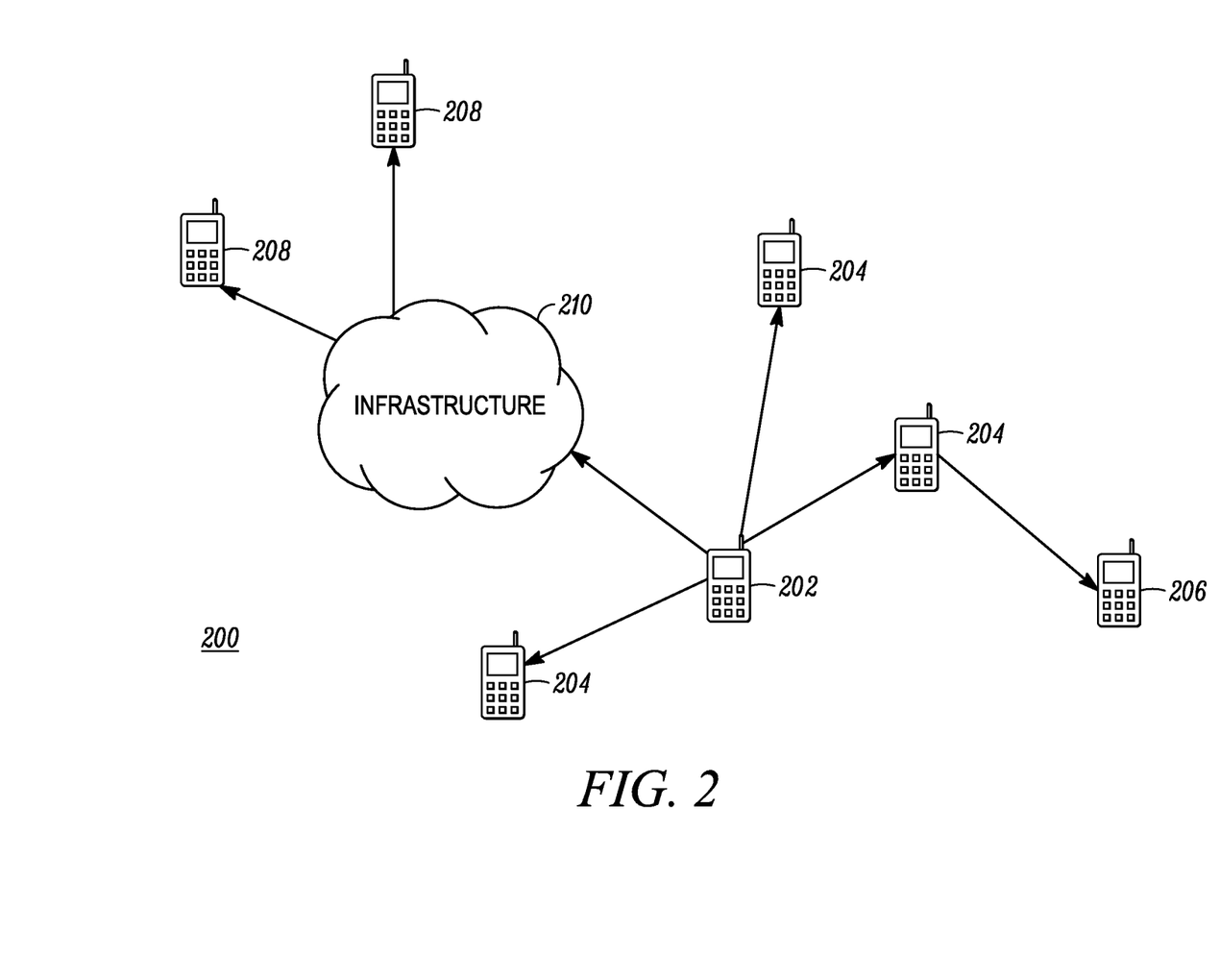
FIG. 2 illustrates a communication system according to one embodiment.
Figure 3:
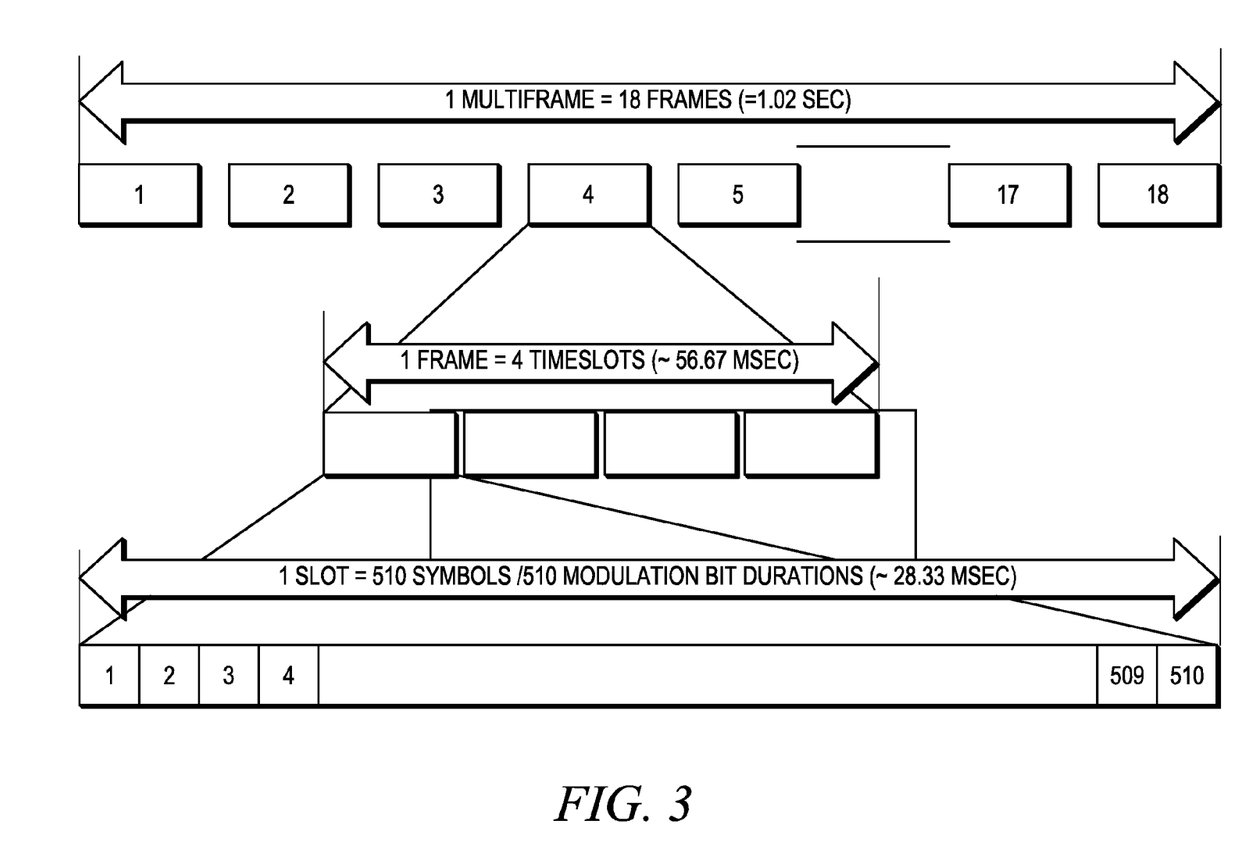
FIG. 3 illustrates a diagram showing timing of various components in a TETRA multiframe.

A system employing the device of FIG. 1 is shown in FIG. 2. As shown, the system 200 contains multiple devices 202, 204, 206, 208. One of the devices (transmitter) 202 has established communication with a talkgroup containing the other devices (receivers) 204, 206, 208. Mobile devices communicate using protocols that are defined by the standard employed by the mobile devices. One such standard, TErrestrial Trunked RAdio (TETRA), is defined by the European Telecommunications Standards Institute (ETSI). TETRA allows a mobile device to operate outside a dedicated network coverage area using direct mode operation (DMO), device-to-device, or to work within network coverage using trunked mode operation (TMO), employing infrastructure 210. In TMO, communications are controlled and facilitated by a switching and management infrastructure (SwMI) (not shown). When a mobile device operates in DMO, there is no system controller and therefore no centralized timing synchronization or infrastructure control to help minimize interference. As shown, in DMO, the transmitter 202 can use one receiver 204 as an intermediary to forward the data to another receiver 206. In TMO, the infrastructure 210 includes base stations, repeaters, and other known communication elements.

Generally, the transmitter 202 and receivers 204, 206, 208 can operate in a simplex or duplex mode. In simplex mode, only one of the transmission or reception paths is active, while in duplex mode both the transmission and reception paths are active. Duplex mode is more comfortable for a user as the user need not continuously depress the PTT button to speak to hold a conversation. The TETRA standard supports both full duplex mode and simplex mode, where the latter is used for group communication (Group Calls). The simplex mode supported by TETRA has a protocol that allows a device sufficient time to switch between transmission and reception modes.

TETRA is a Time Division Multiple Access (TDMA) system in which multiple data signals are multiplexed in time for transmission over a common channel. TDMA increases the efficiency of the spectrum because it allows several users to share a single frequency. In the TETRA standard, the frames are combined into a multiframe that consists of 18 frames, each of which is formed of four slots. The duration of the multiframe is 1.02 seconds. Each slot has a burst length of 14.167 ms and thus each frame has a duration of 56.667 mS. The data structure has a length of 255 symbols or 510 modulation bits. The transmitter or receiver is only active during predetermined time periods, the data being transmitted or received in bursts, and thus reducing the drain on the battery.

Figure 4:
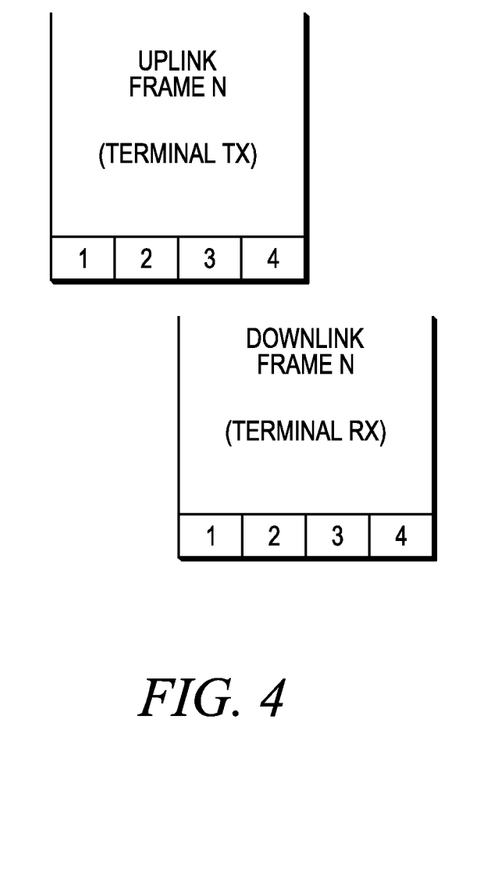
FIG. 4 illustrates transmission and reception in TETRA frames.

The TETRA standard calls for a two slot time shift between up-link slots (transmission to base station) and down-link slots (reception from base station), as shown in FIG. 4. This allows the device to switch from transmission to reception mode (or reception to transmission mode). It also ensures that the device is not transmitting and receiving at the same time, which would otherwise require an undesired duplex filter. Thus, as shown, up-link slot 1 coincides with down-link slot 3, with the up-link and down-link radio channels having different and appropriately spaced radio frequencies. In a full duplex call the device transmits audio data up-link in slot 1 and receives audio data from the other conversation partner downlink in slot 1.

Figure 5:
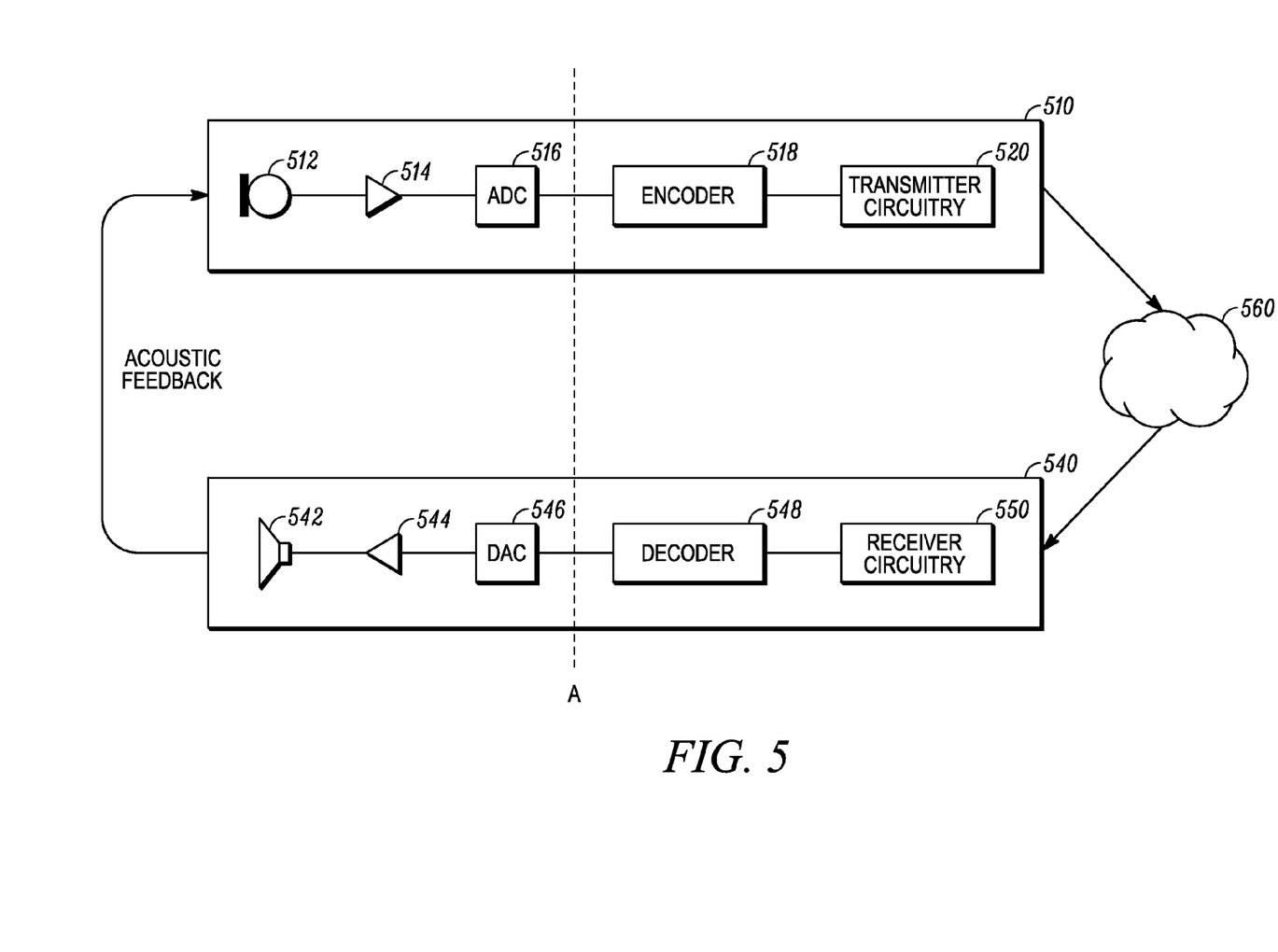
FIG. 5 is a block diagram showing an example of acoustic feedback in a communication system.

FIG. 5 illustrates a block diagram of a simplex communication between a transmitter/receiver pair using TMO. Only some of the components within the transmitter 510 and receiver 530 are shown for convenience. For example, the transmitter 510 and receiver 530 are capable of switching roles and thus have both sets of components. In addition, more than one of each component may be present. The transmitter 510 contains a microphone 512, an amplifier (e.g., a power amplifier) 514, an analog-to-digital converter (ADC) 516, an encoder 518 and RF transmitter circuitry 520. The microphone 512 receives an audio input and converts the audio input into an analog signal. The analog signal from the microphone 512 is supplied to the amplifier 514 whose gain can be preset or adjustable via an external adjustment mechanism or via an internal algorithm using a processor such as a DSP. The amplified analog signal from the amplifier 514 is then sampled at a predetermined clock frequency and thus converted into a digital signal at the ADC 516, which is supplied with the clock signal. The digital signal from the ADC 516 is then processed by the DSP, where, for example, the signal is filtered and encoded by the encoder 518 for transmission. The resulting processed signal is provided to RF transmitter circuitry 520, where the encoded signal is transmitted up-link, in slot 2 for example, to the infrastructure 560. The encoder 518, which performs an ACELP vocoder encoding process for example, may be either an algorithm in the DSP or an entirely separate hardware component than the DSP.

The receiver 530 in FIG. 5 receives down-link, in this example in slot 2, the encoded signal from the infrastructure. If the transmitter 510 and receiver 530 are collocated, the same base station (not shown) that transmits the encoded signal to other elements in the infrastructure 560 (such as a controller) also either receives the encoded signal from the infrastructure 560 and conveys it to the receiver 530 or loops-back internally the received encoded signal and conveys it to the receiver 530. The receiver 530 contains RF receiver circuitry 550, a decoder 548, a digital-to-analog converter (DAC) 546, a power amplifier 544, and a speaker 532. The received digital signal is supplied to the RF receiver circuitry 550. The digital signal, which is encoded, is decoded by the decoder 548 as well being further processed, e.g., by filtering the signal. The decoder 548 may be either an algorithm in the receiver DSP or an entirely separate hardware component than the DSP. The encoder 518/decoder 548 may use any algorithm to encode/decode the audio signal, such as the popular Algebraic Code Excited Linear Prediction (ACELP) algorithm in which a limited set of pulses is distributed as excitation to linear prediction filter.

The decoded signal is then converted back to an analog signal by the DAC 546. The analog signal from the DAC 546 is then amplified by an amplifier 544 of preset or adjustable gain. An attenuator may be used in both the receiver and transmitter prior to amplification. The amplified signal from the amplifier 544 is then provided to the speaker 542, where it is reproduced.

Figure 10:
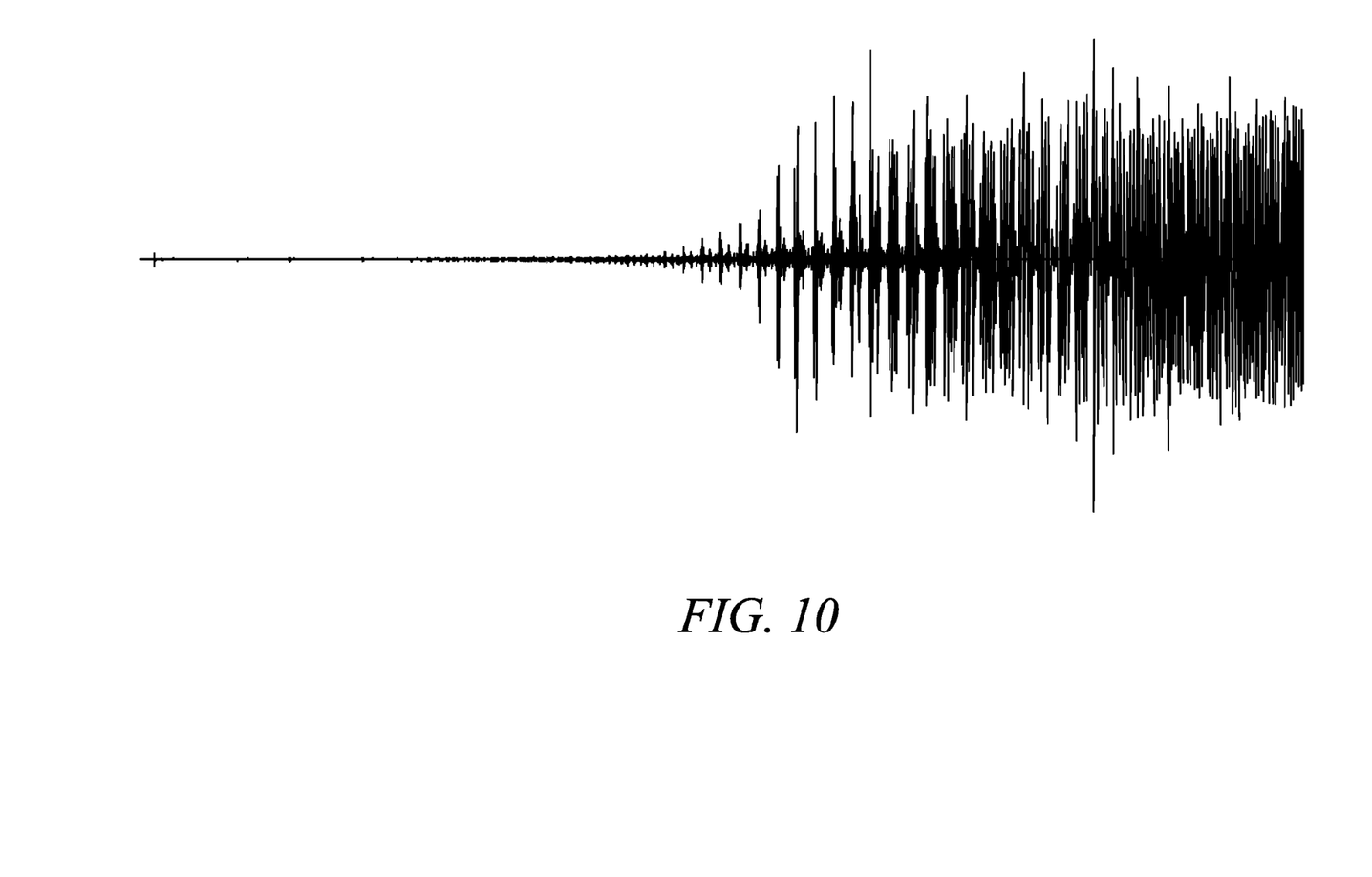
FIG. 10 is the transmitted signal of a TETRA radio under conditions that cause built up of a howling signal.

As above, under certain conditions, howling will occur. If the transmitter 510 and receiver 530 are collocated, the microphone 512 of the transmitter 510 may pick up the audio reproduced by the speaker 532 of the receiver 530. In this case if the loop gain is at least 0 dB the loop formed is unstable and a howling signal will gradually be built-up and, if the phase of the audio signal fed back to the microphone 512 of the transmitter 510 is a multiple of $2\pi$, become a steady state oscillation saturating the speech transmission channel, as shown in FIG. 10. The loop gain is dependent on the transmitter and receiver sensitivities (i.e., device-related characteristics such as the microphone and speaker sensitivity at the particular frequency and the amplification/attenuation in the devices) and the free-space loss of the acoustic signal from the receiver speaker to the transmitter microphone.

As the loop gain is proportional to the amplification of the receiver and inversely proportional to the distance between the transmitter and receiver, howling can be eliminated either by reducing the volume of the speaker or by the users separating to increase the acoustic loss with distance. However, either solution may not be feasible if there is a substantial amount of ambient noise (in which case the volume may need to be increased) and/or the users are required to be near enough to each other (such as emergency service personnel responding to an event) such that even setting the volume at a level that the user can barely hear results in howling. Thus, reducing the loop gain may not alone be a viable option to prevent howling.

Accordingly, measures may be taken to cancel out the inadvertently received audio signal that leads to howling. However, because the signal being received at the microphone of the transmitter from the speaker of the receiver is substantially delayed from the original audio signal supplied by the user of the transmitter, any correction signal to be applied is to be delayed to coincide with the feedback signal to be effective. To this end, the system should account for a loop delay when operating in either the DMO or TMO mode. The loop delay in the system of FIG. 5 is separated by the dashed line A shown in FIG. 5. As shown, the delay to the left of dashed line A is due to the microphone 512, amplifier 514, and ADC 516 in the transmitter 510, the speaker 542, amplifier 544, and DAC 546 in the receiver 540, and the length of time it takes for the audio from the speaker 542 to reach the microphone 512. The delay to the right of dashed line A is due to the encoder 518 and transmission circuitry 520 in the transmitter 510, the decoder 548 and receiver circuitry 550 in the receiver 540, and the length of time it takes for the audio to be transmitted from the transmitter 510 to the receiver 540 using the infrastructure 560.

The delay originating from the left of dashed line A is relatively small compared to the delay originating from the right of dashed line A. For example, typical left hand side delay times are: (as the speed of sound in air is about 343 meters/second) if the transmitter 510 and receiver 540 are about 3 meters apart, the delay is about 10 ms plus typical delay times in A/D and D/A converters of 2.5 ms, yielding 15 ms in total. The right hand side delay due to the vocoder encoder and decoder and handling of frame 18 not carrying audio are substantially greater and yield approximately 108 ms. The round trip delay between the transmitter and the receiver via the infrastructure may be about 42 ms, if the infrastructure receives and transmits the encoded signal within the same 56.67 ms frame, or about 99 ms, if the infrastructure receives the encoded signal in one frame and transmits it in the following frame due to excessive internal propagation time. The essence of this is that the actual round trip delay is unknown from a terminal perspective.

Figure 6:
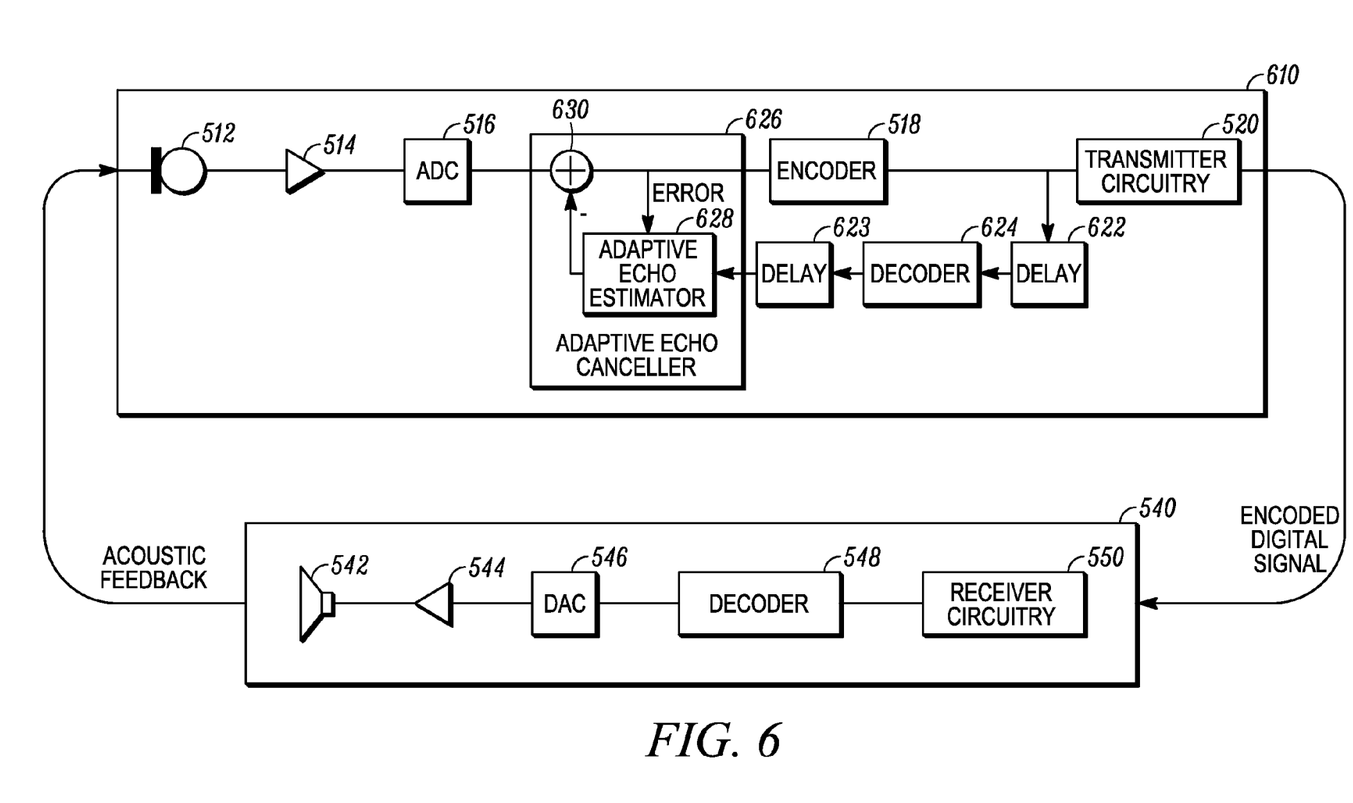
FIG. 6 is a block diagram showing an embodiment of eliminating acoustic feedback in devices operating using direct mode communications.

Turning to the transmitter/receiver system of FIG. 6, note that only one receiver is shown in this embodiment for convenience; in a talkgroup, multiple receivers may be present, which will be discussed below. FIG. 6 illustrates a block diagram of a simplex communication between a transmitter/receiver pair using DMO. As in FIG. 5, only some of the components within the transmitter 610 are shown for convenience and more than one of each component may be present. Similar to FIG. 5, the transmitter 610 contains a microphone 512, an amplifier (e.g., a power amplifier) 514, an analog-to-digital converter (ADC) 516, an encoder 518 and RF transmitter circuitry 520.

The encoded digital signal from the transmitter 610 is received by the RF receiver circuitry 550 of the receiver 540. The encoded digital signal is decoded by the decoder 548 and then converted back to an analog signal by the DAC 546. The analog signal from the DAC 546 is then amplified by the amplifier 544 and then provided to the speaker 542, where it is reproduced. The reproduced audio signal is picked up by the microphone 512 of the transmitter 610.

Unlike the transmitter 510 of FIG. 5, the transmitter 610 also contains a delay 622, a decoder 624, and an adaptive echo canceller 626 provided in a feedback path. The encoded digital signal from the encoder 518 is delayed by the delay 622 and then decoded by the decoder 624. The decoder 624 in the transmitter 610 is essentially the same as the decoder 548 of the receiver 540. This permits any distortion introduced by the encoding and subsequent decoding of the acoustic signal along the transmission/reception path to be replicated in the feedback path. The delay 623 is applied to the decoded signal before it is applied as reference signal to the adaptive echo canceller 626. The magnitude of the delay corresponds to the sum of the estimated propagation time with flat frequency response (no attenuation distortion with frequency) for the receive path of a (e.g., TETRA) radio from the decoder 548 to the speaker 542 and the propagation time with flat frequency response from the microphone 512 to the input of the combiner 630 in the transmitter 610. The estimated flat delay for the receive path of a (e.g., TETRA) radio from the decoder 548 to the speaker 542 may be obtained by design analysis, may be an imperial value obtained by test or measurements or may be obtained at run time by an adaptive process that seeks to maximize convergence depth of the adaptive echo canceller 626. The purpose of the delay 623 is to position in time the cancellation window of the adaptive echo canceller 626 such that the part of the cancellation window covering flat delay is minimized, which minimizes the required cancellation window length.

The adaptive echo canceller 626 contains an adaptive echo estimator 628 and a combiner 630. The adaptive echo estimator 628 is supplied with the delayed decoded digital signal and estimates the signal to cancel the acoustic feedback signal picked up by the microphone 512. The signal from the adaptive echo estimator 628 is subtracted from the digitized signal from the ADC 516 at the combiner 630. The signal from the combiner 630 is supplied to the adaptive echo estimator 628 as an error signal and used to adjust the output of the adaptive echo estimator 628 to better remove the unwanted acoustic feedback. The adaptive acoustic echo canceller 626 thus produces Echo Return Loss Enhancement (ERLE), i.e., a loss in dB applied only to the acoustic feedback signal, thereby increasing the loop stability without substantially affecting the desired signal. Note that the positions of the delay 622 and decoder 624 can be interchanged and the delay 623 can be implemented as part of delay 622. Some or all of the delay 622, delay 623, decoder 624, and adaptive echo canceller 626 may be implemented in the same DSP used to implement the encoder 618.

In DMO, the transmitter acts as the base station in the TMO—defining the transmission frequency and timing. The receiving terminal, in turn, synchronizes to the received signal. Thus, unlike a transmitter/receiver pair operating in TMO in which a majority of the delay is set by the infrastructure and inherently unknown, the delay in DMO can be well approximated (within a few ms at most) from known processes internal to the transmitter and receiver as the transmission of the digital signal is essentially instantaneous and the propagation time from the transmitter to the receiver is known and essentially constant.

The adaptive echo canceller 626 can be any echo canceller known in the art, such as echo canceller that operates in the time or frequency domain. The adaptive echo canceller 626 contains an adaptive filter that will converge towards the transfer function of the feedback path from the decoder 548 of the receiver 540 to the input from ADC 516 of the adaptive echo canceller 626 in the transmitter 610, a transfer function that includes the speaker response, to reduce the echo and avoid howling. The adaptive acoustic echo canceller 626 will thus converge when acoustic feedback is present (i.e., when a howling signal starts building up in the feedback loop). Without the separate delay 622, the delay able to be provided by the adaptive echo canceller 626 [the echo path delay capability or time window for cancellation] should equal or exceed the total delay of the transmitter/receiver system including the delay from the decoder of the receiver 540 to the speaker 542, the acoustic multipath delay from the speaker 542 of the receiver 540 to the microphone 512 of the transmitter 510 and any delay between the microphone 512 and the adaptive echo canceller 626.

The delay 622 provides a fixed delay, which in the direct mode of operation shown in FIG. 6 is able to be relatively well estimated and short enough such that the delay is able to be implemented within the DSP or separately. The echo path delay capability for the adaptive echo canceller 626 is sufficiently small to ensure fast convergence of the adaptive echo canceller 626 as well as being cost-effective enough to be used in mobile devices. However, because the additional variation in loop delay (about 57 ms) for a transmitter/receiver pair operating in trunked mode is to be covered by the echo path delay capability of the adaptive echo canceller 626, implementation in a cost-effective manner of an adaptive echo canceller with fast convergence in mobile devices is not easy at best.

Figure 7:
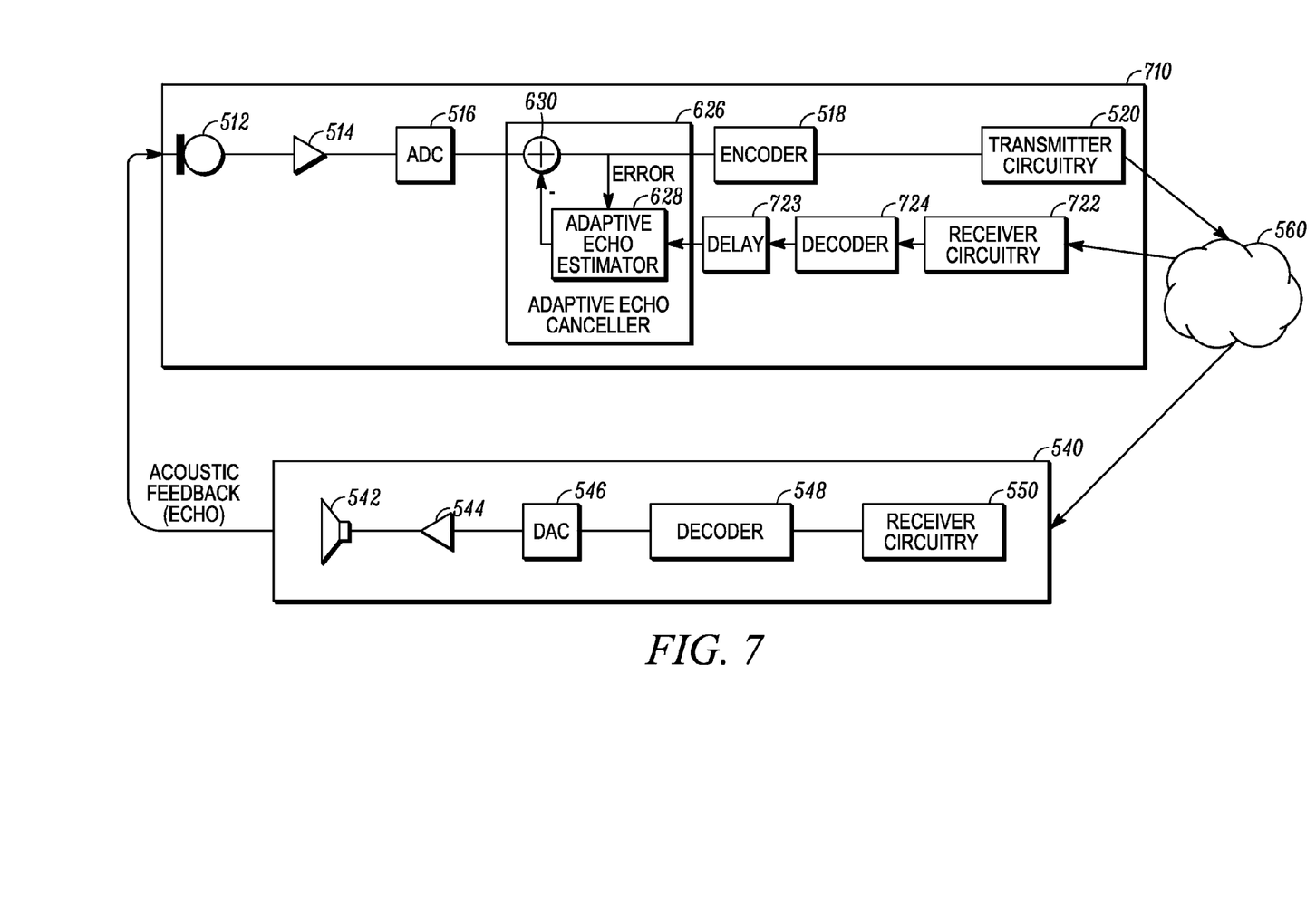
FIG. 7 is a block diagram showing an embodiment of eliminating acoustic feedback in devices operating using trunked mode communications.

FIG. 7 illustrates a block diagram of a simplex communication between a transmitter/receiver pair using TMO. As in FIG. 5, only some of the components within the transmitter 710 are shown for convenience and more than one of each component may be present. Similar to FIG. 6, the transmitter 710 contains a microphone 512, an amplifier (e.g., a power amplifier) 514, an ADC 516, an encoder 518 and RF transmitter circuitry 520. The transmitter 710 also contains RF receiver circuitry 722, a decoder 724, a delay 723 and an adaptive echo canceller 626. The adaptive echo canceller 626 carries out the same functions as that described in relation to FIG. 6 and the delay 723 carries out the same functions as the delay 623 described in relation to FIG. 6.

As above TMO, the transmitter 710 transmits the digital signal to the infrastructure. Rather than attempting to delay the encoded digital signal locally in the transmitter 710, the transmitter 710 instead receives the encoded digital signal from the infrastructure 560 using the RF receiver circuitry 722 in the transmitter 710. This eliminates the need for increasing the time window of the adaptive echo canceller 626 by the amount of the variable delay (about 57 ms) as the same encoded digital signal received by the RF receiver circuitry 722 and decoded by the decoder 724 in the transmitter 710 is also simultaneously being received by the RF receiver circuitry 550 and decoded by the decoder 548 in the receiver 540. Any delay used is associated only with the differences between the acoustic paths of the two received signals is relatively minimal and further minimized by the delay 723. As above, the time window of the adaptive echo canceller 626 alone would be unable to compensate for the excessively long delay introduced by the infrastructure 560.

The decoded signal in the transmitter 710 is delayed by the delay 723 and then, as in transmitter 610 of FIG. 6, supplied to the adaptive echo canceller 626, where it is used to cancel the acoustic feedback causing howling. The decoder 724, the delay 723 and perhaps a portion of the RF receiver circuitry 722 may be implemented by the same DSP that implements the encoder 518 and portion of the RF transmitter circuitry 520.

The timing of when the encoded digital signal is received is dependent on the delay introduced by infrastructure 560 in addition to the protocol-induced delay. This is to say that, as above, the downlink slot in which the encoded digital signal is received and the uplink transmission slot in which the encoded digital signal is sent are shifted in time by 2 slots. This permits the transmitter 710 operating under simplex conditions, to transmit data in one slot and receive earlier-transmitted data in a different slot to correct for the acoustic feedback induced by the earlier-transmitted data. Thus, the transmission path including the RF transmitter circuitry 520 is active and the reception path including the RF receiver circuitry 722 is inactive during the slot when the transmitter 710 is transmitting the current signal and the RF transmitter circuitry 520 is inactive and the reception path including the RF receiver circuitry 722 is active during the slot when the transmitter 710 is receiving its own earlier-transmitted signal. If desired, the signal received by the transmitter 710 may be delayed at any point along the reception path to coincide with the acoustic feedback causing howling.

Figure 8:
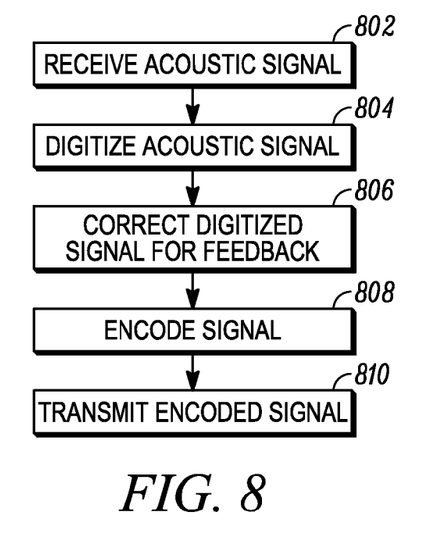
FIG. 8 is an embodiment of a method of operating a communication device in which acoustic feedback is eliminated.
Figure 9:
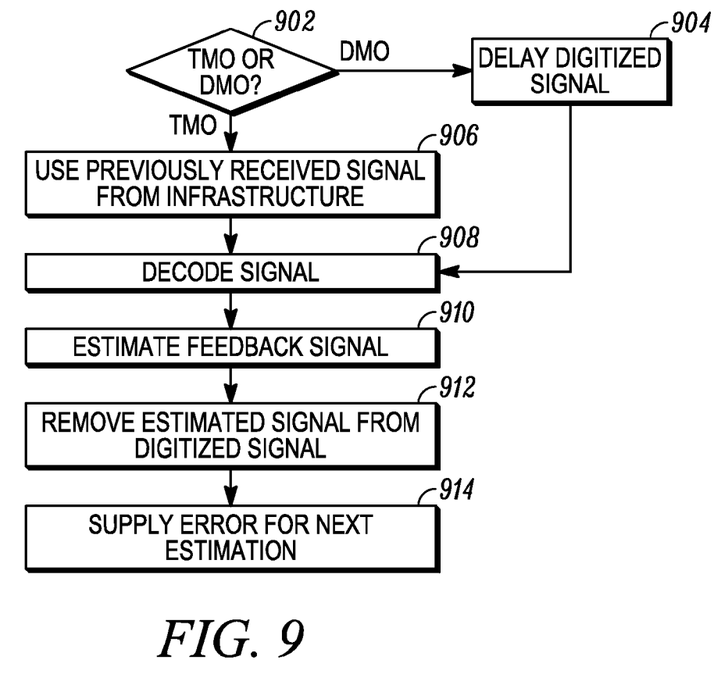
FIG. 9 is a block diagram showing an embodiment of a method of eliminating acoustic feedback.

Flowcharts of the basic method of reducing acoustic feedback are shown in FIGS. 8 and 9. An acoustic signal from a user, along with unwanted acoustic feedback from the speaker of one or more receivers, is received at the transmitter microphone at step 802. The total signal is digitized at step 804 and then corrected to remove the acoustic feedback at step 806. After correction, the corrected signal is encoded at step 808 and then transmitted to the receiver either directly or through the infrastructure at step 810. Other processing that may occur during transmission is not provided for brevity.

In FIG. 9, a method of correcting for the acoustic feedback is shown. The method varies dependent on whether the transmitter determines it is operating in TMO or DMO shown as step 902 (thus both mechanisms are present in such an embodiment). If DMO is being used, the total signal is delayed at step 904 by a predetermined amount that is estimated based on the propagation delay of the feedback path (less the decoding time). If TMO is being used, a digital signal previously received from the infrastructure is used at step 906. In either case, the digital signal is decoded at step 908 and the acoustic feedback signal is estimated from the digital signal at step 910. The estimated acoustic feedback signal is used to correct the digital signal to be transmitted at step 912 by subtracting the estimated acoustic feedback signal from the digital signal to be transmitted. The error signal resulting from the subtraction is then provided to adaptively correct for the next estimation at step 914. Note that although all of the components shown in FIGS. 6 and 7 are usually present to allow the correction in either DMO or TMO (and are selectable by a switch implemented in software or hardware), if correction is desired to be provided for only one of the modes, the components needed for the other mode may be eliminated if it is not used in other, non-correction related functions. For example, the delay 622 may be eliminated if only correction for TMO is desired, thereby reducing the number of parts if delay 622 is separate or freeing up memory/circuitry in the DSP if the delay is provided in the DSP.

Thus, in the embodiments shown, the transmitter generates a time-aligned exact replicate of the audio signal at output of the decoder of the receiver, thereby enabling the transmitter to cancel the audio feedback in the transmission path using an adaptive acoustic echo canceller that has a path delay capability comparable to the acoustic propagation time from the receiver speaker to the transmitter microphone. The ERLE produced by the adaptive acoustic echo canceller increases the loop stability for distances between the transmitter/receiver shorter than without the ERLE loss. As the unwanted signal is cancelled, the desired signal remains unaffected. During TMO, the transmitter generates the replica by operating its own receiver circuitry and decoder at the appropriate time, which is essentially the same time as that of operation of the receiver for which the audio signal was intended.

In addition, the reproduction times for multiple receivers are substantially the same in either mode, the overall time differences depending primarily on the differences between the processing times in the transmitter and various receivers as in either mode the electromagnetic signal launched by transmitter and being received by the various receivers (as well as the reverse for the audio signal) are essentially the same. In one embodiment, the same delayed digital signal in the transmitter may be used to adaptively cancel the acoustic feedback from all of the receivers. Alternatively, if the number and types of receivers, along with their processing times, are known, the timing for the acoustic feedback from each receiver can be independently determined and corrected for. Alternatively, the transmitter may send a short test signal prior when obtaining the floor prior to transmitting the audio signal to determine the delays. In either case, the information may be stored after the initial determination and updated periodically or when the group members change (i.e., an existing device leaves the group or a new device joins the group), a signal being sent in the latter case to indicate the new group membership, or the transmitter user indicates a change in the group of radio users in close proximity via a user interface of the transmitter.

Although not shown, the echo cancellation can be combined with an amplification limiter, limiting the amplification in the transmitter, and may be activated only if the echo exceeds a predetermined threshold, thereby limiting or preventing saturation and distortion in the receive paths and speaker systems of receivers, saturation and distortion that otherwise could impair the adaptive echo canceller's ability to converge. For example, the threshold can be set such that the loop gain is slightly less than 0 dB to stop howling from occurring. In addition, if a link between the transmitter and receiver is available to pass information regarding howling conditions, the volume or the amplification of the receiver may be limited.

In various embodiments of the present invention, some of the disclosed methods may be implemented as a computer program product for use with a communication device. Such implementations may include a series of computer instructions fixed either on a tangible medium, such as a computer readable medium (e.g., a diskette, CD-ROM, ROM, or fixed disk). The medium may be a tangible medium (e.g., optical or analog communications lines). The series of computer instructions embodies all or part of the functionality previously described herein with respect to the device. Those skilled in the art should appreciate that such computer instructions can be written in a number of programming languages for use with many device architectures or operating systems. Furthermore, such instructions may be stored in any memory device, such as semiconductor, magnetic, optical or other memory. It is expected that such a computer program product may be distributed as a removable medium with accompanying printed or electronic documentation (e.g., shrink wrapped software) or preloaded with a device (e.g., on system ROM or fixed disk). Of course, some embodiments of the invention may be implemented as a combination of both software (e.g., a computer program product) and hardware. Still other embodiments of the invention are implemented as entirely hardware, or entirely software (e.g., a computer program product).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for reducing howling in a communication system containing collocated mobile devices, the method comprising:
at a first one of the collocated mobile devices:
processing an audio signal, received at a microphone, to remove acoustic feedback from the audio signal to produce a modified signal;
encoding, via an encoder, the modified audio signal;
transmitting, via a transmitter, the encoded audio signal to an intermediate infrastructure device for further transmission to other mobile device;
receiving, via a receiver, the encoded audio signal back from the intermediate infrastructure device:
decoding, via a decoder, the encoded audio signal; and
feeding back the decoded audio signal, via a feedback circuit, while processing the audio signal to enable the acoustic feedback to be removed from the audio signal, the decoded audio signal being sufficiently delayed prior to processing the audio signal to enable processing of the audio signal at an appropriate time,
wherein the acoustic feedback comprises a delayed version of the audio signal, and
wherein the appropriate time accounts for differces between acoustic paths of the encoded audio signal received at the first one of the collocated mobile devices and the encoded audio signal received at a second one of the collocated mobile devices.

2. The method of claim 1, wherein the processing further comprises:
estimating a cancellation signal used to cancel the acoustic feedback from the decoded audio signal;
subtracting the estimated cancellation signal from the audio signal; and
altering the cancellation signal to adaptively cancel the acoustic feedback using the decoded audio signal and an error signal obtained from the subtraction of the estimated cancellation signal from the audio signal.

3. The method of claim 1, wherein the acoustic feedback comprises a delayed version of the audio signal resulting from decoding of the transmitted encoded audio signal at a receiver of a second one of the collocated mobile devices to produce a decoded audio signal, emission of the decoded audio from a speaker of the second one of the collocated mobile devices producing an emitted audio signal and reception of the emitted audio signal at the microphone of the first one of the collocated mobile devices.

4. The method of claim 1, wherein the intermediate infrastructure device operates in a trunked mode of operation.

5. A first mobile device collocated with a second mobile device, the first mobile device comprising:
a microphone configured to receive an audio signal;
an echo canceller configured to remove acoustic feedback from the audio signal and to produce a modified signal;
an encoder configured to encode the modified audio signal;
transmitter circuitry configured to transmit the encoded audio signal to an intermediate infrastructure device for further transmission to other mobile devices;
receiver circuitry configured to receive the encoded audio signal back from the intermediate infrastructure device;
a decoder configured to decode the encoded audio signal,
wherein the decoded audio signal is fed back, via a feedback circuit, to the echo canceller, which uses the decoded audio signal to remove the acoustic feedback from the audio signal, the decoded audio signal being sufficiently delayed prior to being supplied to the echo canceller to enable removal of the acoustic feedback at an appropriate time,
wherein the acoustic feedback comprises a delayed version of the audio signal received at the microphone, and
wherein the appropriate time accounts for differences between acoustic paths of the encoded audio signal received at the first collocated mobile device and the encoded audio signal received at the second collocated mobile device.

6. The mobile device of claim 5, wherein the echo canceller comprises:
an echo estimator configured to estimate a cancellation signal used to remove the acoustic feedback from the audio signal; and
a combiner configured to subtract the estimated cancellation signal from the audio signal,
wherein the echo estimator adapts the cancellation signal using the decoded audio signal and an error signal obtained from the subtraction of the estimated cancellation signal from the audio signal.

7. The mobile device of claim 5, wherein the acoustic feedback comprises a delayed version of the audio signal resulting from decoding of the transmitted encoded audio signal at a receiver of the second mobile device to produce a decoded audio signal, emission of the decoded audio from a speaker of the second mobile device producing an emitted audio signal and reception of the emitted audio signal at the microphone of the mobile device.

8. The mobile device of claim 5, wherein the intermediate infrastructure device operates in a trunked mode of operation.

* * * * *